US012287630B2

(12) United States Patent
Pandit et al.

(10) Patent No.: US 12,287,630 B2
(45) Date of Patent: Apr. 29, 2025

(54) ARRANGING PASSENGER PICKUPS FOR AUTONOMOUS VEHICLES

(71) Applicant: WAYMO LLC, Mountain View, CA (US)

(72) Inventors: Salil Pandit, Palo Alto, CA (US); Nirmal Patel, Sunnyvale, CA (US); Tacettin Dogacan Guney, San Jose, CA (US); Kevin Rawlings, Santa Clara, CA (US); Laurens Andreas Feenstra, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 400 days.

(21) Appl. No.: 17/952,468

(22) Filed: Sep. 26, 2022

(65) Prior Publication Data
US 2023/0083667 A1 Mar. 16, 2023

Related U.S. Application Data

(63) Continuation of application No. 16/799,945, filed on Feb. 25, 2020, now Pat. No. 11,487,287, which is a
(Continued)

(51) Int. Cl.
G05D 1/00 (2024.01)
G06Q 10/02 (2012.01)
(Continued)

(52) U.S. Cl.
CPC ......... *G05D 1/0088* (2013.01); *G06Q 10/025* (2013.01); *G06Q 50/40* (2024.01); *G08G 1/202* (2013.01)

(58) Field of Classification Search
CPC .... G05D 1/0088; G06Q 10/025; G06Q 50/40; G06Q 50/10; G08G 1/202
See application file for complete search history.

(56) References Cited

U.S. PATENT DOCUMENTS 5,187,664 A 2/1993 Yardley et al.
6,119,065 A 9/2000 Shimada et al.
(Continued)

FOREIGN PATENT DOCUMENTS

CA 3006983 A1 6/2017
CN 109313846 A 2/2019
(Continued)

OTHER PUBLICATIONS

Examiner's Report for Canadian Patent Application No. 3,073,847 dated Jun. 11, 2021.
(Continued)

Primary Examiner — Bhavesh V Amin
(74) Attorney, Agent, or Firm — Botos Churchill IP Law

(57) ABSTRACT

Aspects of the disclosure relate to arranging a pick up and drop off locations between a driverless vehicle and a passenger. As an example, a method of doing so may include receiving a request for a vehicle from a client computing device, wherein the request identifies a first location. Pre-stored map information and the first location are used to identify a recommended point according to a set of heuristics. Each heuristic of the set of heuristics has a ranking such that the recommended point corresponds to a location that satisfies at least one of the heuristics having a first rank and such that no other location satisfies any other heuristic of the set of heuristics having a higher rank than the first rank. The pre-stored map information identifying a plurality of pre-determined locations for the vehicle to stop, and the recommended point is one of the plurality of pre-determined locations. The recommended point is then provided the client computing device for display on a display of the client computing device with a map.

24 Claims, 8 Drawing Sheets

Related U.S. Application Data continuation of application No. 16/510,041, filed on Jul. 12, 2019, now Pat. No. 11,209,823, which is a continuation of application No. 15/689,283, filed on Aug. 29, 2017, now Pat. No. 10,401,858.

(51) Int. Cl.
*G06Q 50/40* (2024.01)
*G08G 1/00* (2006.01)

(56) References Cited

U.S. PATENT DOCUMENTS

| | | |
|---|---|---|
| 6,208,934 B1 | 3/2001 | Bechtolsheim |
| 6,321,158 B1 | 11/2001 | Delorme et al. |
| 6,374,182 B2 | 4/2002 | Bechtolsheim |
| 6,542,811 B2 | 4/2003 | Doi |
| 6,654,683 B2 | 11/2003 | Jin et al. |
| 6,728,708 B1 | 4/2004 | Yotka et al. |
| 6,750,786 B1 | 6/2004 | Racunas |
| 6,772,142 B1 | 8/2004 | Kelling et al. |
| 6,820,002 B2 | 11/2004 | Terada |
| 6,826,477 B2 | 11/2004 | Ladetto et al. |
| 6,834,229 B2 | 12/2004 | Rafiah et al. |
| 6,904,362 B2 | 6/2005 | Nakashima et al. |
| 7,522,992 B2 | 4/2009 | Obradovich et al. |
| 7,606,580 B2 | 10/2009 | Granito et al. |
| 7,617,044 B2 | 11/2009 | Lee |
| 7,840,427 B2 * | 11/2010 | O'Sullivan ............ G06Q 10/02 |
| | | 340/988 |
| 7,957,871 B1 | 6/2011 | Echeruo |
| 8,027,803 B2 | 9/2011 | Kitamura et al. |
| 8,090,532 B2 | 1/2012 | Tashev et al. |
| 8,564,456 B2 | 10/2013 | Selevan |
| 8,688,306 B1 | 4/2014 | Nemec et al. |
| 8,700,251 B1 | 4/2014 | Zhu et al. |
| 8,700,314 B2 | 4/2014 | Vavrus et al. |
| 8,738,291 B2 | 5/2014 | Ford et al. |
| 8,880,270 B1 | 11/2014 | Ferguson et al. |
| 8,935,034 B1 | 1/2015 | Zhu et al. |
| 8,938,358 B1 | 1/2015 | Shynar et al. |
| 8,983,973 B2 | 3/2015 | Hill et al. |
| 9,082,239 B2 | 7/2015 | Ricci |
| 9,216,737 B1 | 12/2015 | Zhu et al. |
| 9,217,648 B2 | 12/2015 | Huck et al. |
| 9,372,087 B2 | 6/2016 | Asai et al. |
| 9,448,559 B2 | 9/2016 | Kojo et al. |
| 9,519,290 B2 | 12/2016 | Kojo et al. |
| 9,567,007 B2 | 2/2017 | Cudak et al. |
| 9,568,328 B1 | 2/2017 | Abuelsaad et al. |
| 9,583,991 B2 * | 2/2017 | Iannello ............... F16C 32/0442 |
| 9,612,125 B2 | 4/2017 | Goel |
| 9,625,906 B2 | 4/2017 | Meuleau et al. |
| 9,696,171 B2 | 7/2017 | Bostick et al. |
| 9,726,510 B2 | 8/2017 | Peri et al. |
| 9,733,096 B2 | 8/2017 | Colijn et al. |
| 9,769,616 B1 | 9/2017 | Pao et al. |
| 9,847,037 B2 | 12/2017 | Selevan |
| 9,894,484 B1 | 2/2018 | Pao et al. |
| 10,012,995 B2 | 7/2018 | Kojo et al. |
| 10,042,359 B1 | 8/2018 | Konrardy et al. |
| 10,083,608 B2 * | 9/2018 | O'Sullivan .... G06Q 10/063112 |
| 10,156,449 B2 | 12/2018 | Colijn et al. |
| 10,297,152 B1 | 5/2019 | Patel et al. |
| 10,331,129 B2 | 6/2019 | Iagnemma et al. |
| 10,401,858 B2 | 9/2019 | Pandit et al. |
| 10,453,339 B2 * | 10/2019 | O'Sullivan ........... G06Q 10/025 |
| 10,593,206 B2 * | 3/2020 | O'Sullivan ............ G06Q 10/02 |
| 10,593,207 B2 * | 3/2020 | O'Sullivan ........ G01C 21/3423 |
| 10,593,208 B1 * | 3/2020 | O'Sullivan ........... G06Q 10/025 |
| 10,635,599 B2 | 4/2020 | Duzly et al. |
| 10,648,831 B2 | 5/2020 | Beaurepaire et al. |
| 10,672,271 B2 * | 6/2020 | O'Sullivan ............ G06Q 50/40 |
| 10,718,622 B2 | 7/2020 | Colijn et al. |
| 10,741,071 B2 * | 8/2020 | O'Sullivan ............ G06Q 10/00 |
| 10,816,349 B2 | 10/2020 | Wu et al. |
| 11,209,823 B2 | 12/2021 | Pandit et al. |
| 11,222,389 B2 | 1/2022 | Sweeney et al. |
| 2001/0030667 A1 | 10/2001 | Kelts |
| 2002/0091793 A1 | 7/2002 | Sagie |
| 2002/0112237 A1 | 8/2002 | Kelts |
| 2002/0145620 A1 | 10/2002 | Smith et al. |
| 2003/0033083 A1 | 2/2003 | Nakashima et al. |
| 2003/0036827 A1 | 2/2003 | Murphy |
| 2003/0036848 A1 | 2/2003 | Sheha et al. |
| 2003/0083073 A1 | 5/2003 | Cossins et al. |
| 2003/0109266 A1 | 6/2003 | Rafiah et al. |
| 2003/0191582 A1 | 10/2003 | Terada |
| 2004/0006425 A1 | 1/2004 | Wood et al. |
| 2004/0257340 A1 | 12/2004 | Jawerth |
| 2005/0032527 A1 | 2/2005 | Sheha et al. |
| 2005/0131645 A1 * | 6/2005 | Panopoulos ......... G05D 1/0282 |
| | | 701/472 |
| 2005/0283305 A1 | 12/2005 | Clark et al. |
| 2006/0009234 A1 | 1/2006 | Freer |
| 2006/0069503 A1 | 3/2006 | Suomela et al. |
| 2007/0277113 A1 | 11/2007 | Agrawal et al. |
| 2008/0027639 A1 | 1/2008 | Tryon |
| 2008/0195428 A1 * | 8/2008 | O'Sullivan ............ G06Q 10/02 |
| | | 705/6 |
| 2008/0291925 A1 | 11/2008 | Fisher et al. |
| 2009/0018766 A1 | 1/2009 | Chen et al. |
| 2009/0119001 A1 | 5/2009 | Moussaeiff et al. |
| 2009/0235176 A1 | 9/2009 | Jayanthi |
| 2010/0070165 A1 | 3/2010 | Kang |
| 2010/0123737 A1 | 5/2010 | Williamson et al. |
| 2010/0168996 A1 | 7/2010 | Bourque et al. |
| 2010/0205060 A1 | 8/2010 | Athsani et al. |
| 2010/0211303 A1 | 8/2010 | Stanton |
| 2010/0248746 A1 | 9/2010 | Saavedra et al. |
| 2010/0280853 A1 | 11/2010 | Petralia et al. |
| 2011/0010084 A1 | 1/2011 | Carlsson et al. |
| 2011/0059693 A1 * | 3/2011 | O'Sullivan ............ G06Q 50/40 |
| | | 455/41.1 |
| 2011/0063132 A1 | 3/2011 | Trum |
| 2011/0178697 A1 | 7/2011 | Mincey et al. |
| 2011/0191017 A1 | 8/2011 | Certin |
| 2011/0238289 A1 | 9/2011 | Lehmann et al. |
| 2011/0276407 A1 | 11/2011 | Bangera et al. |
| 2011/0313657 A1 | 12/2011 | Myllymaki et al. |
| 2011/0313967 A1 | 12/2011 | Zafar et al. |
| 2012/0001741 A1 | 1/2012 | Watanabe |
| 2012/0072051 A1 | 3/2012 | Koon |
| 2012/0215641 A1 | 8/2012 | Ohki |
| 2012/0253660 A1 | 10/2012 | Dillahunt et al. |
| 2012/0256765 A1 | 10/2012 | Selevan |
| 2012/0265433 A1 | 10/2012 | Viola et al. |
| 2013/0103697 A1 | 4/2013 | Hill et al. |
| 2013/0166197 A1 | 6/2013 | Tseng et al. |
| 2013/0231824 A1 | 9/2013 | Wilson et al. |
| 2013/0293396 A1 | 11/2013 | Selevan |
| 2014/0279261 A1 | 9/2014 | Krishna Kolluri et al. |
| 2014/0297415 A1 | 10/2014 | Chu et al. |
| 2014/0309806 A1 | 10/2014 | Ricci |
| 2014/0310739 A1 | 10/2014 | Ricci et al. |
| 2015/0081362 A1 | 3/2015 | Chadwick et al. |
| 2015/0168169 A1 | 6/2015 | Caceres et al. |
| 2015/0219464 A1 | 8/2015 | Beaurepaire et al. |
| 2015/0241241 A1 | 8/2015 | Cudak et al. |
| 2015/0285652 A1 | 10/2015 | Peri et al. |
| 2015/0339928 A1 | 11/2015 | Ramanujam |
| 2016/0034828 A1 | 2/2016 | Sarawgi et al. |
| 2016/0209842 A1 | 7/2016 | Thakur et al. |
| 2016/0209843 A1 | 7/2016 | Meuleau et al. |
| 2016/0209845 A1 | 7/2016 | Kojo et al. |
| 2016/0209848 A1 | 7/2016 | Kojo et al. |
| 2016/0223345 A1 | 8/2016 | Thakur et al. |
| 2016/0225255 A1 | 8/2016 | Thakur et al. |
| 2016/0247094 A1 | 8/2016 | Scicluna et al. |
| 2016/0265922 A1 | 9/2016 | Thakur et al. |
| 2016/0301698 A1 | 10/2016 | Katara et al. |
| 2016/0370194 A1 | 12/2016 | Colijn et al. |
| 2017/0003687 A1 | 1/2017 | Kojo et al. |
| 2017/0039864 A1 | 2/2017 | Selevan |
| 2017/0132934 A1 | 5/2017 | Kentley et al. |

(56) References Cited

U.S. PATENT DOCUMENTS

| | | |
|---|---|---|
| 2017/0169535 A1 | 6/2017 | Tolkin et al. |
| 2017/0192432 A1 | 7/2017 | Arden et al. |
| 2017/0219364 A1 | 8/2017 | Lathrop et al. |
| 2017/0243485 A1* | 8/2017 | Rubin ............... H04W 4/46 |
| 2017/0270794 A1 | 9/2017 | Sweeney |
| 2017/0329346 A1 | 11/2017 | Latotzki |
| 2017/0370734 A1 | 12/2017 | Colijn et al. |
| 2018/0113455 A1 | 4/2018 | Iagnemma et al. |
| 2018/0113456 A1 | 4/2018 | Iagnemma et al. |
| 2018/0113457 A1 | 4/2018 | Iagnemma et al. |
| 2018/0113463 A1 | 4/2018 | Iagnemma et al. |
| 2018/0113470 A1 | 4/2018 | Iagnemma et al. |
| 2018/0137742 A1 | 5/2018 | Zhang et al. |
| 2018/0143649 A1 | 5/2018 | Miao et al. |
| 2018/0164817 A1 | 6/2018 | Herz et al. |
| 2018/0188058 A1 | 7/2018 | Dabholkar |
| 2018/0188731 A1 | 7/2018 | Matthiesen et al. |
| 2018/0224858 A1 | 8/2018 | Watanabe et al. |
| 2018/0267541 A1 | 9/2018 | Goldberg et al. |
| 2018/0322642 A1 | 11/2018 | Kolouri et al. |
| 2018/0357907 A1 | 12/2018 | Reiley et al. |
| 2019/0066501 A1* | 2/2019 | O'Sullivan ......... G01C 21/3423 |
| 2019/0096251 A1* | 3/2019 | O'Sullivan .... G06Q 10/063112 |
| 2019/0156670 A1* | 5/2019 | O'Sullivan ............ G06Q 10/02 |
| 2019/0161190 A1 | 5/2019 | Gil et al. |
| 2019/0170520 A1 | 6/2019 | Colijn et al. |
| 2019/0172351 A1* | 6/2019 | O'Sullivan ........... G06Q 50/40 |
| 2019/0197895 A1* | 6/2019 | O'Sullivan .......... G06Q 10/025 |
| 2019/0228345 A1 | 7/2019 | Oesterling et al. |
| 2019/0228656 A1* | 7/2019 | O'Sullivan .... G06Q 10/063112 |
| 2019/0228657 A1* | 7/2019 | O'Sullivan ............ G06Q 10/00 |
| 2019/0369621 A1 | 12/2019 | Pandit et al. |
| 2020/0104770 A1 | 4/2020 | Aich et al. |
| 2020/0109959 A1 | 4/2020 | Wu et al. |
| 2020/0242945 A1 | 7/2020 | Beaurepaire et al. |
| 2020/0292333 A1 | 9/2020 | Colijn et al. |
| 2021/0209713 A1 | 7/2021 | Imtiyaz et al. |

FOREIGN PATENT DOCUMENTS

| | | |
|---|---|---|
| JP | 10208195 A | 8/1998 |
| JP | H11184521 A | 7/1999 |
| JP | 2000047620 A | 2/2000 |
| JP | 2001101460 A | 4/2001 |
| JP | 2002009946 A | 1/2002 |
| JP | 2008111842 A | 5/2008 |
| JP | 2017116832 A | 6/2017 |
| JP | 2017524195 A | 8/2017 |
| JP | 2018-536910 | 12/2018 |
| KR | 20170036570 | 4/2017 |
| KR | 20170142210 A | 12/2017 |
| WO | 2016002527 A1 | 1/2016 |
| WO | 2016209595 A1 | 12/2016 |
| WO | 2017036639 A1 | 3/2017 |
| WO | 2017117095 A1 | 7/2017 |
| WO | 2017128890 A1 | 8/2017 |

OTHER PUBLICATIONS

Japanese Office Action for Application No. JP2020-505815 dated Apr. 27, 2021.
Notice of Allowance for Korean Patent Application No. 10-2020-7005659, Feb. 28, 2022.
Notice of Preliminary Rejection for Korean Patent Application No. 10-2020-7005659, Aug. 19, 2021.
"Extended European Search Report for Application No. 18849669.9 dated Mar. 1, 2021, EPO, Munich, Germany."
"International Search Report and Written Opinion received for PCT Patent Application No. PCT/US2018/041781, mailed on Nov. 29, 2018", 12 pages.
"Notice of Eligibility including Search and Examination Report for Singapore Application No. 11202000872U dated Mar. 1, 2021, IPOS, Singapore."

* cited by examiner

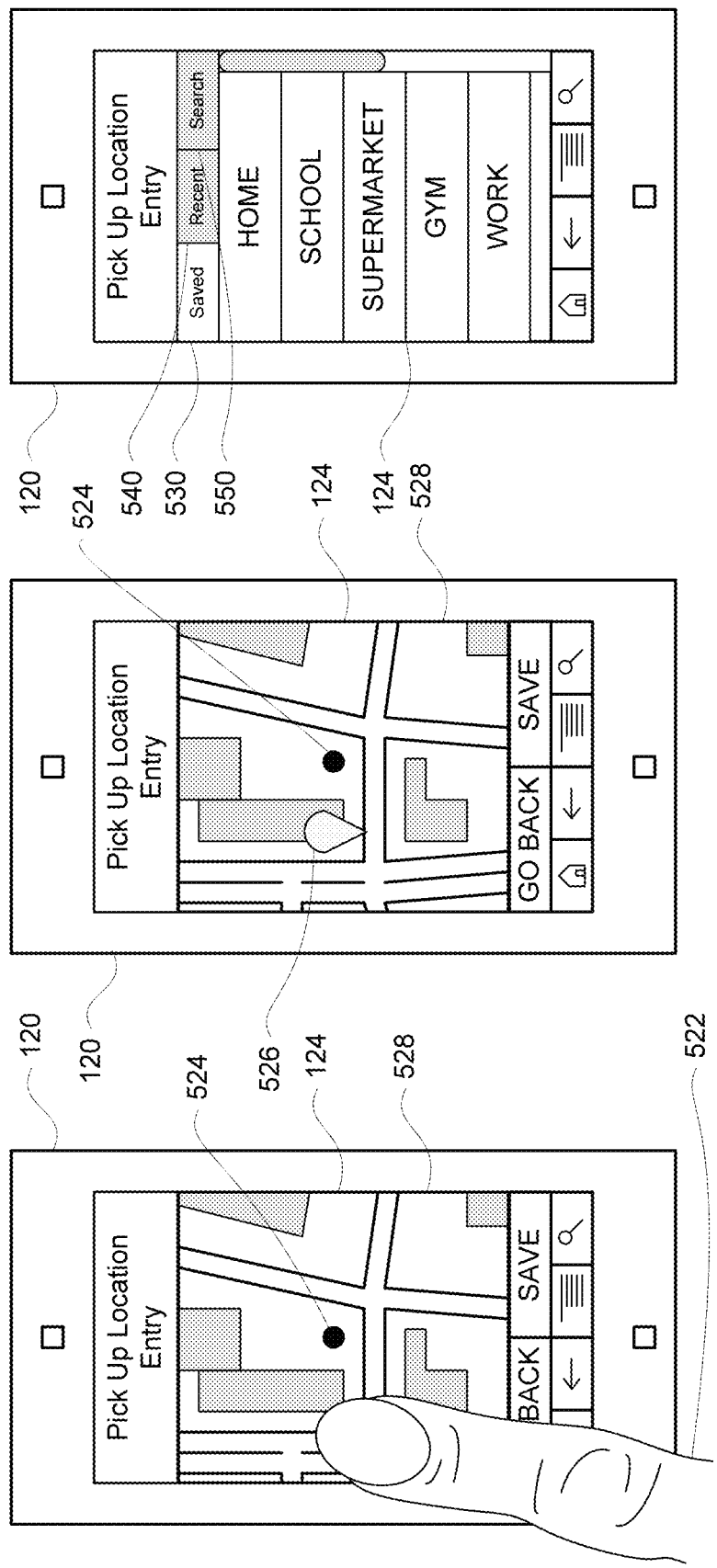

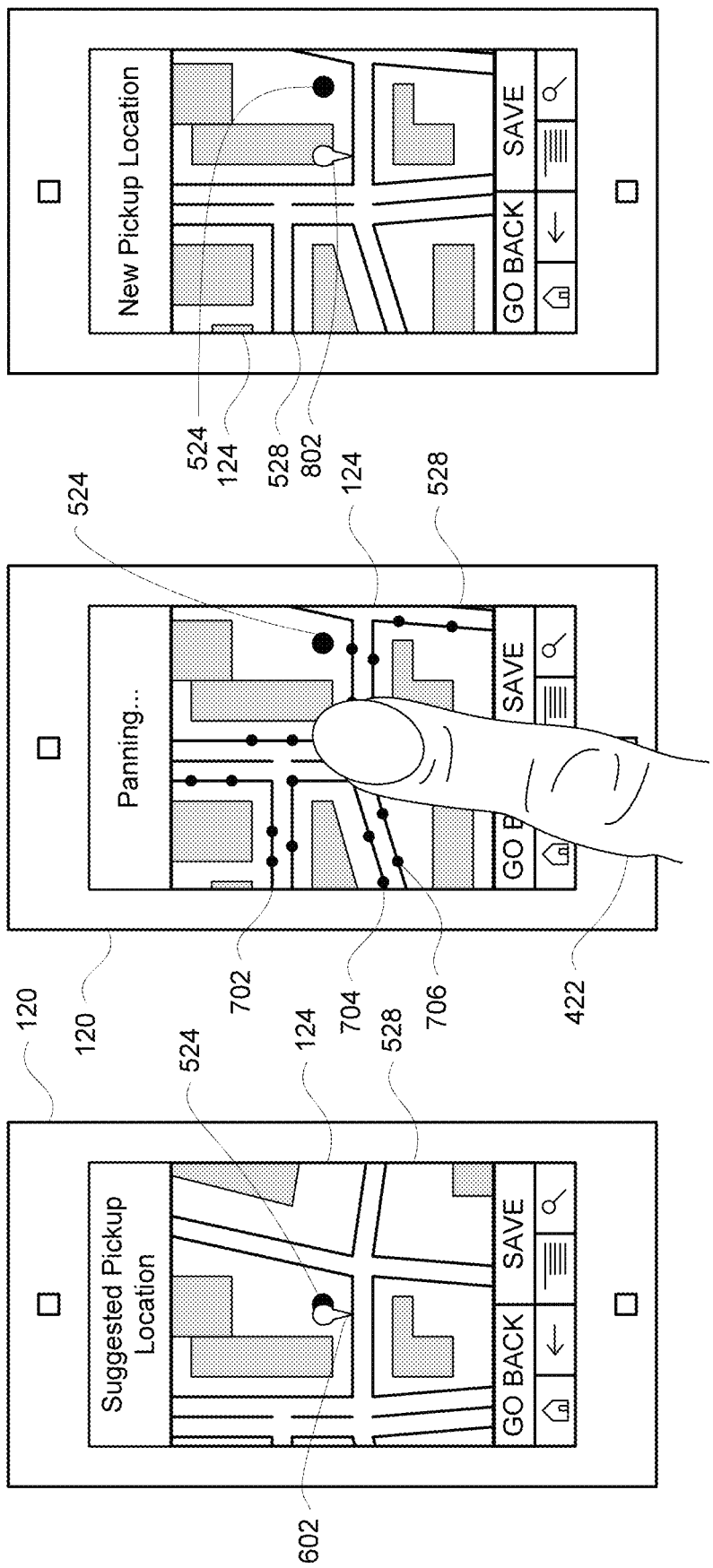

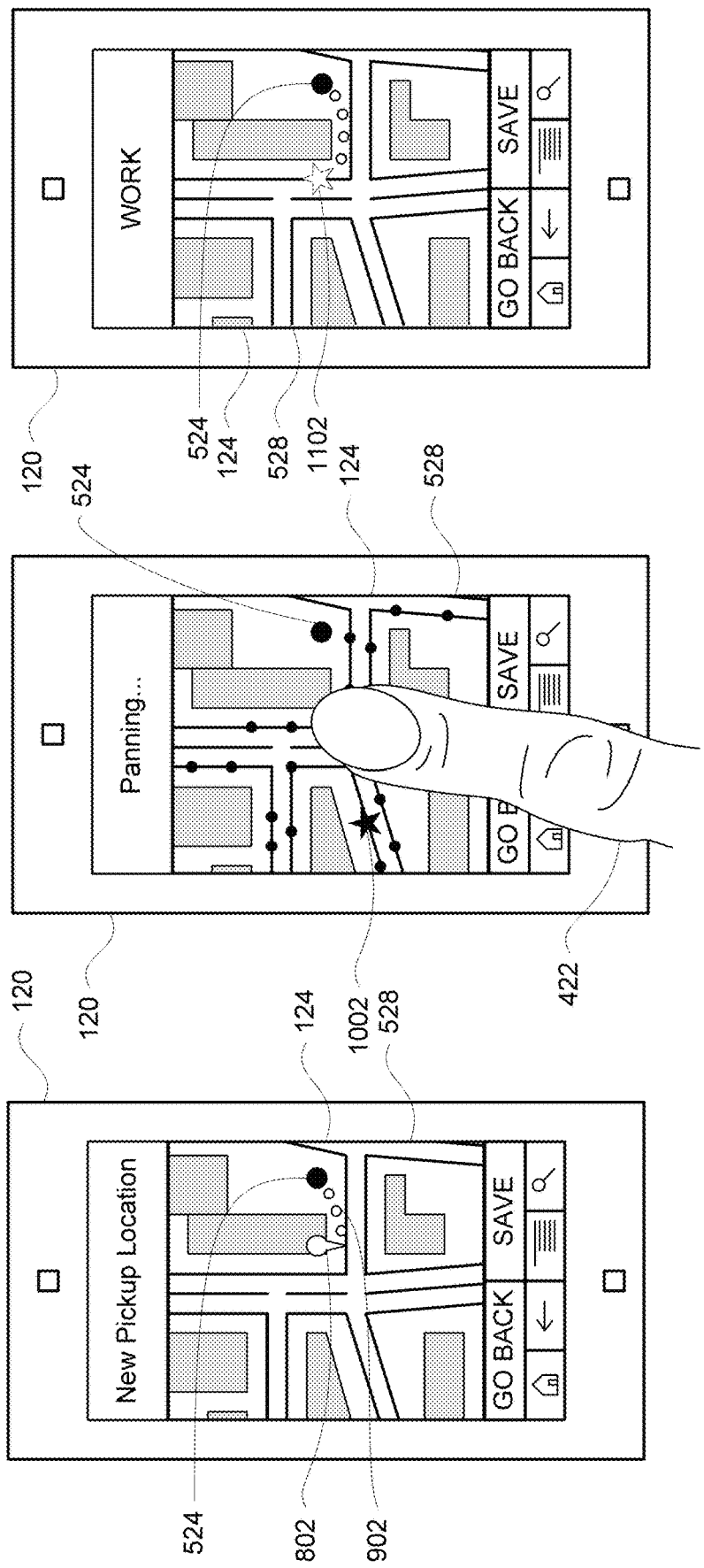

ARRANGING PASSENGER PICKUPS FOR AUTONOMOUS VEHICLES

CROSS-REFERENCE TO RELATED APPLICATIONS

This application is a continuation of U.S. application Ser. No. 16/799,945, filed Feb. 25, 2020, which is a continuation of U.S. application Ser. No. 16/510,041, filed Jul. 12, 2019, and issued as U.S. Pat. No. 11,209,823 on Dec. 28, 2021, which is a continuation of U.S. application Ser. No. 15/689,283, filed Aug. 29, 2017 and issued as U.S. Pat. No. 10,401,858 on Sep. 3, 2019, the entire disclosures of which are hereby incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

When a person (or user) wants to be physically transported between two locations via a vehicle, they may use any number of taxi services. To date, these services typically involve a human driver who is given dispatch instructions to a location to pick up and drop off the user. Generally these locations are worked out via physical signals (i.e. flagging down the driver), a phone call where the user explains where he or she actually is, or an in person discussion between the driver and user. These services, while useful, generally fail to provide users with exacting information about where a pickup or drop off will occur.

BRIEF SUMMARY

One aspect of the disclosure provides a method. The method includes receiving a request for a vehicle from a client computing device, wherein the request identifies a first location; using pre-stored map information and the first location to identify a recommended point according to a set of heuristics, wherein each heuristic of the set of heuristics has a ranking such that the recommended point corresponds to a location that satisfies at least one of the heuristics having a first rank and such that no other location satisfies any other heuristic of the set of heuristics having a higher rank than the first rank, the pre-stored map information identifying a plurality of pre-determined locations for the vehicle to stop, and wherein the recommended point is one of the plurality of pre-determined locations; and providing the recommended point to the client computing device for display on a display of the client computing device with a map.

In one example, the at least one heuristic corresponds to the recommended point being (1) a previously identified user-preferred location included in a trip history for a user associated with the client computing device and (2) within a predetermined walking distance of the first location. In another example, the at least one heuristic corresponds to the recommended point being (1) a previous location at which a user associated with the client computing device was picked up or dropped off and (2) included in a trip history for the user and the previous location being within a predetermined walking distance of the first location. In another example, the at least one heuristic corresponds to the recommended point being (1) a predesignated preferred pullover spot for the vehicle according to the map information and (2) within a predetermined walking distance of the first location, and the map information identifies a plurality of predesignated preferred pullover spots for the vehicle. In another example, the at least one heuristic corresponds to the recommended point being (1) a predesignated preferred pullover spot for the vehicle according to the map information and (2) within a predetermined walking distance of the first location. In another example, the at least one heuristic corresponds to the recommended point being (1) within a predetermined distance of a known entrance of a building according to the map information and (2) the first location is within a building outline of the map information. In another example, the at least one heuristic corresponds to the recommended point being (1) within a predetermined distance of a handicapped parking spot according to the map information and (2) within a predetermined walking distance of the first location. In another example, the at least one heuristic corresponds to the recommended point being within a predetermined distance of a location of a street address corresponding to the first location when (1) the first location is a GPS location of the client computing device and (2) the GPS location corresponds to a residential area identified in the map information. In another example, the at least one heuristic corresponds to the recommended point being a closest predetermined stopping location to the first location according to the map information identifying a plurality of predetermined stopping locations for the vehicle to pull over. In another example, the method also includes receiving a current location of the client computing device; determining a walkable path between the current location and the recommended point using the map information; and providing the walkable path for display on the map with the recommended point. In another example, the map information identifies a set of predetermined locations for the vehicle to stop, and the method also includes identifying a subset of the plurality of pre-determined locations that are within a predetermined radial distance of the first location and providing the subset for display on the map when a user pans on the map. In another example, the method also includes receiving a request for additional pre-determined locations for a new location, identifying a second subset of the plurality of pre-determined locations that are within a predetermined radial distance of the new location, and providing the second subset for display on the map when a user pans on the map. In another example, the map information identifies a set of predetermined locations for the vehicle to stop, and the method also includes receiving a current location of the client computing device; identifying a subset of the plurality of pre-determined locations that are within a predetermined radial distance of the current location; and providing the subset for display on the map when a user pans on the map. In this example, the method also includes receiving a request for additional pre-determined locations for a new location, identifying a second subset of the plurality of pre-determined locations that are within a predetermined radial distance of the new location, providing the second subset for display on the map when a user pans on the map. In another example, the method also includes receiving a confirmation message identifying the first location and dispatching a vehicle to pick up or drop off a passenger at the first location.

Another aspect of the disclosure provides a system including one or more server computing devices having one or more processors. The one or more processors re configured to receive a request for a vehicle from a client computing device, wherein the request identifies a first location; use pre-stored map information and the first location to identify a recommended point according to a set of heuristics, wherein each heuristic of the set of heuristics has a ranking such that the recommended point corresponds to a location that satisfies at least one of the heuristics having a first rank and such that no other location satisfies any other heuristic of the set of heuristics having a higher rank than the first rank, the pre-stored map information identifying a plurality of pre-determined locations for the vehicle to stop, and wherein the recommended point is one of the plurality of pre-determined locations; and provide the recommended point to the client computing device for display on a display of the client computing device with a map.

In one example, the at least one heuristic corresponds to the recommended point being (1) a previously identified user-preferred location included in a trip history for a user associated with the client computing device and (2) within a predetermined walking distance of the first location. In another example, the at least one heuristic corresponds to the recommended point being (1) a previous location at which a user associated with the client computing device was picked up or dropped off and (2) included in a trip history for the user and the previous location being within a predetermined walking distance of the first location. In another example, the at least one heuristic corresponds to the recommended point being (1) a predesignated preferred pullover spot for the vehicle according to the map information and (2) within a predetermined walking distance of the first location, and the map information identifies a plurality of predesignated preferred pullover spots for the vehicle. In another example, the at least one heuristic corresponds to the recommended point being (1) within a predetermined distance of a known entrance of a building according to the map information and (2) the first location is within a building outline of the map information.

BRIEF DESCRIPTION OF THE DRAWINGS

FIGS. 5A-11 are various example screen shots and client computing devices in accordance with aspects of the disclosure.

DETAILED DESCRIPTION

Overview

The technology relates to autonomous vehicle services for maneuvering a passenger or passengers to a destination, for example taking a trip, autonomously. An important aspect of the technology includes actually identifying and serving locations where an autonomous vehicle can stop to pick up or drop off a passenger. As an example once a user has "set" a marker for a preferred location, the system may use a ranked set of heuristics to surface one or more locations closest to that pin. This may involve identifying favorite spots (for this passenger), recent spots, preferred spots (for parking the vehicle), or locations near an entrance to a building (or close to a handicapped parking spot which can indicate an entrance is nearby) proximate to the pin. In many instances, a best location can be identified, but in some cases, there will be two or three equally ranked locations. In such cases, a walking path from the pin can be displayed for each of the locations at once allowing the passenger to more easily gauge the relevance of each location; of course, this may also be done if there is only one location. If none of the aforementioned heuristics provide results, the system may simply identify the closest walkable location. Once this is completed, the passenger may adjust this location, for instance by panning (picking up the pin) the map. While the panning occurs, the system can highlight other potential locations which the passenger can select by "dropping" the pin on such locations and ending the panning.

The features described herein may allow an autonomous vehicle service to identify the most useful pickup and drop off locations while at the same time clearly providing context to a passenger about such locations. This balances the effort needed for the passenger to get to and from the self-driving vehicle with the ability of the vehicle to consistently pull over in known good spots.

Example Systems

Figure 1:
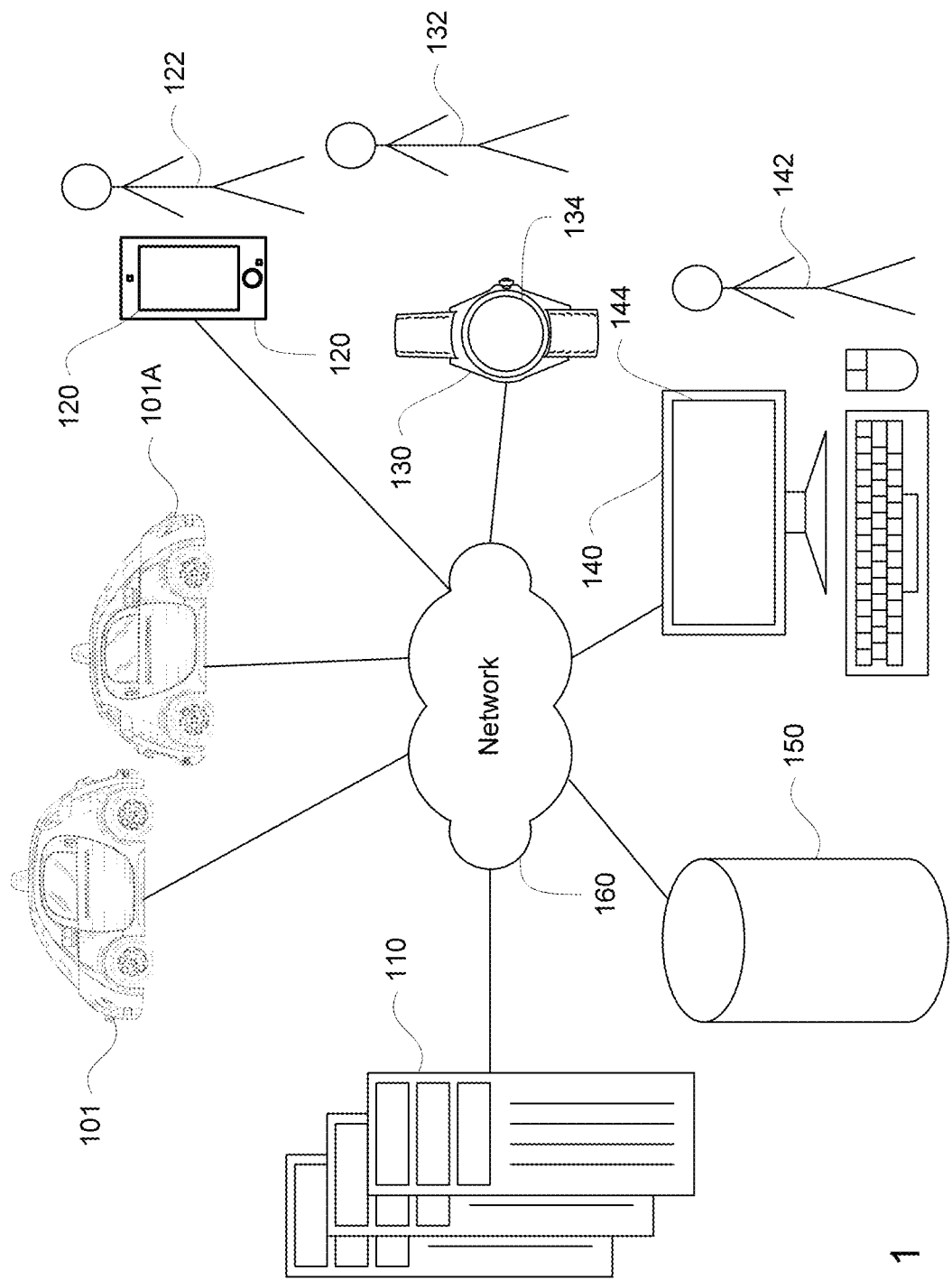
FIG. 1 is a pictorial diagram of a system in accordance with aspects of the disclosure.
Figure 2:
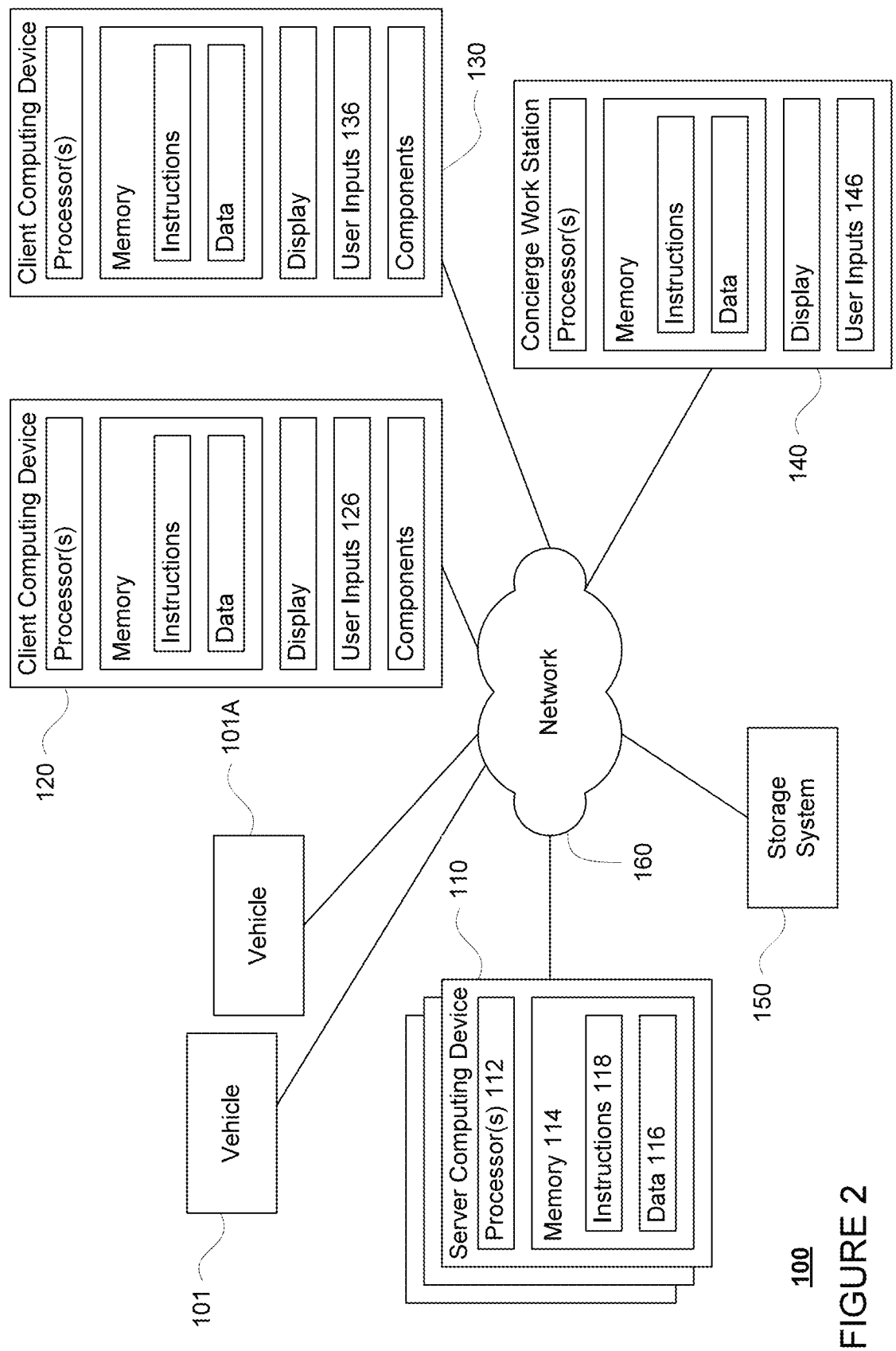
FIG. 2 is a functional diagram of the system of FIG. 1 in accordance with aspects of the disclosure.

FIGS. 1 and 2 are pictorial and functional diagrams, respectively, of an example system 100 that includes a plurality of computing devices 110, 120, 130, 140 and a storage system 150 connected via a network 160. System 100 also includes vehicle 101 and vehicle 101A which may be configured similarly to vehicle 101. Although only a few vehicles and computing devices are depicted for simplicity, a typical system may include significantly more.

As shown in FIG. 1, each of computing devices 110, 120, 130, 140 may include one or more processors, memory, data and instructions. Such processors, memories, data and instructions may be configured similarly to one or more processors 112, memory 114, data 116, and instructions 118 of the one or more server computing devices 110 as discussed further below.

The memory 114 stores information accessible by the one or more processors 112, including instructions 118 and data 116 that may be executed or otherwise used by the processor 112. The memory 114 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 116 may be retrieved, stored or modified by processor 112 in accordance with the instructions 118. The instructions 118 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processor 112 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. In some examples, this computing device may be a user interface computing device which can communicate with a user's client device. Similarly, the memory may be a hard drive or other storage media located in a housing different from that of computing device 110. Accordingly, references to a processor or computing device will be understood to include references to a collection of processors or computing devices or memories that may or may not operate in parallel.

The network 160, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, the one or more server computing devices 110 may include a plurality of computing devices, e.g., a load balanced server farm, that exchange information with different nodes of a network for the purpose of receiving, processing and transmitting the data to and from other computing devices. For instance, one or more server computing devices 110 may include one or more server computing devices that are capable of communicating with one or more computing devices 310 of vehicle 101 (see FIG. 3) or a similar computing device of vehicle 101A as well as client computing devices 120, 130, 140 via the network 160. For example, vehicles 101 and 101A may be a part of a fleet of vehicles that can be dispatched by server computing devices to various locations. In this regard, the vehicles of the fleet may periodically send the one or more server computing devices location information provided by the vehicle's respective positioning systems and the one or more server computing devices may track the locations of the vehicles.

In addition, server computing devices 110 may use network 140 to transmit and present information to a user, such as user 122, 132, 142 on a display, such as displays 124, 134, 144 of computing devices 120, 130, 140. In this regard, computing devices 120, 130, 140 may be considered client computing devices.

As shown in FIG. 2, each client computing device 120, 130, 140 may be a personal computing device intended for use by a user 122, 132, 142, and have all of the components normally used in connection with a personal computing device including a one or more processors (e.g., a central processing unit (CPU)), memory (e.g., RAM and internal hard drives) storing data and instructions, a display such as displays 124, 134, 144 (e.g., a monitor having a screen, a touch-screen, a projector, a television, or other device that is operable to display information), and user input devices 126, 136, 146 (e.g., a mouse, keyboard, touch-screen or microphone). The client computing devices may also include a camera for recording video streams, speakers, a network interface device, and all of the components used for connecting these elements to one another.

Although the client computing devices 120, 130, and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, a wearable computing device or system, or a netbook that is capable of obtaining information via the Internet or other networks. In another example, client computing device 130 may be a wearable computing system, shown as a head-mounted computing system in FIG. 2. As an example the user may input information using a small keyboard, a keypad, microphone, using visual signals with a camera, or a touch screen.

In some examples, client computing device 140 may be concierge work station used by an administrator to provide concierge services to users such as users 122 and 132. For example, a concierge 142 may use the concierge work station 140 to communicate via a telephone call or audio connection with users through their respective client computing devices or vehicles 101 or 101A in order to ensure the safe operation of vehicles 101 and 101A and the safety of the users as described in further detail below. Although only a single concierge work station 140 is shown in FIGS. 1 and 2, any number of such work stations may be included in a typical system.

Figure 3:
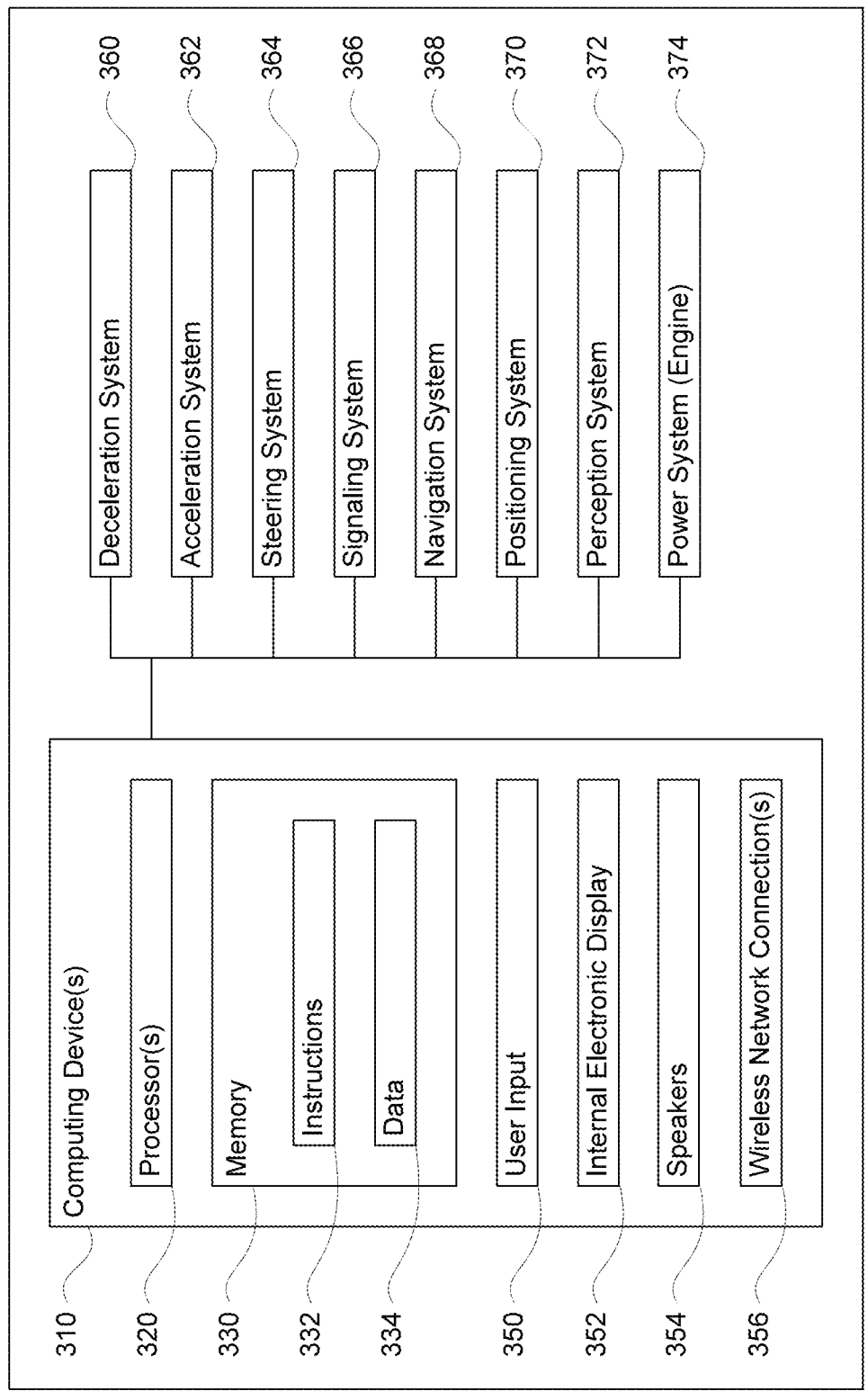
FIG. 3 is an example functional diagram of a control system for a vehicle having an autonomous driving mode in accordance with aspects of the disclosure.

As shown in FIG. 3, a vehicle 101 (or 101A) in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, similar to computing device 310 containing one or more processors 320, memory 330 storing data 334 and instructions 332, and other components typically present in general purpose computing devices as discussed with regard to processors 112 and memory 114 above.

In one example, computing device 310 may be an autonomous driving computing system incorporated into vehicle 101 (or 101A). The autonomous driving computing system may capable of communicating with various components of the vehicle. For example, returning to FIG. 3, computing device 310 may be in communication with various systems of vehicle 101, such as deceleration system 360 (for controlling braking of the vehicle), acceleration system 362 (for controlling acceleration of the vehicle), steering system 364 (for controlling the orientation of the wheels and direction of the vehicle), signaling system 366 (for controlling turn signals), navigation system 368 (for navigating the vehicle to a location or around objects), positioning system 370 (such as GPS receivers for determining the position of the vehicle), perception system 372 (including various sensors for detecting objects in the vehicle's environment), and power system 374 (for example, a battery and/or gas or diesel powered engine) in order to control the movement, speed, etc. of vehicle 300, in accordance with the instructions of the memory, in an autonomous driving mode which does not require or need continuous or periodic input from a passenger of the vehicle. Again, although these systems are shown as external to computing device 310, in actuality, these systems may also be incorporated into computing device 310, again as an autonomous driving computing system for controlling vehicle 101.

The computing device 310 may control the direction and speed of the vehicle by controlling various components. By way of example, computing device 310 may navigate the vehicle to a destination location completely autonomously using data from the map information and navigation system 368. Computer 310 may use the positioning system 370 to determine the vehicle's location and perception system 372 to detect and respond to objects when needed to reach the location safely. In order to do so, computer 310 may cause the vehicle to accelerate (e.g., by increasing fuel or other energy provided to the engine by acceleration system 362), decelerate (e.g., by decreasing the fuel supplied to the engine, changing gears, and/or by applying brakes by deceleration system 360), change direction (e.g., by turning the front or rear wheels of vehicle 101 by steering system 364), and signal such changes (e.g., by lighting turn signals of signaling system 366). Thus, the acceleration system 362 and deceleration system 360 may be a part of a drivetrain that includes various components between an engine of the vehicle and the wheels of the vehicle. Again, by controlling these systems, computing devices 310 may also control the drivetrain of the vehicle in order to maneuver the vehicle autonomously.

Computing devices 310 may also include various other components for communicating with server computing devices 110 as well as a user or passenger. For instance, computing devices 310 may include various wireless network connections to enable the computing devices to communicate with various computing devices of network 160 including server computing devices 110, for instance. In addition, a user or passenger may input information into the computing devices 310 using user inputs 350, such as a touch screen of an internal electronic display 352, a set of buttons, etc. At the same time, in addition to sending information to a user's client computing device over network 160 via the wireless network connections 356, computing devices 310 may provide information to a user or passenger of the vehicle 101 (or 101A) via an internal electronic display 352 and speakers 354.

Storage system 150 may store various types of information as described in more detail below. This information may be retrieved or otherwise accessed by a server computing device, such as one or more server computing devices 110, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

In addition to information that can be used for identification and authentication purposes, the account information may include other information, such as a history of usage of the service. This "trip history" may include the dates, times, pick up locations, drop off locations, and destinations of previous trips using the service. In some examples, the user account information for a user may include "Favorite" spots or previously identified user-preferred locations that the user has saved to his or her account identifying preferred pickup or drop off locations for that user.

Figure 4:
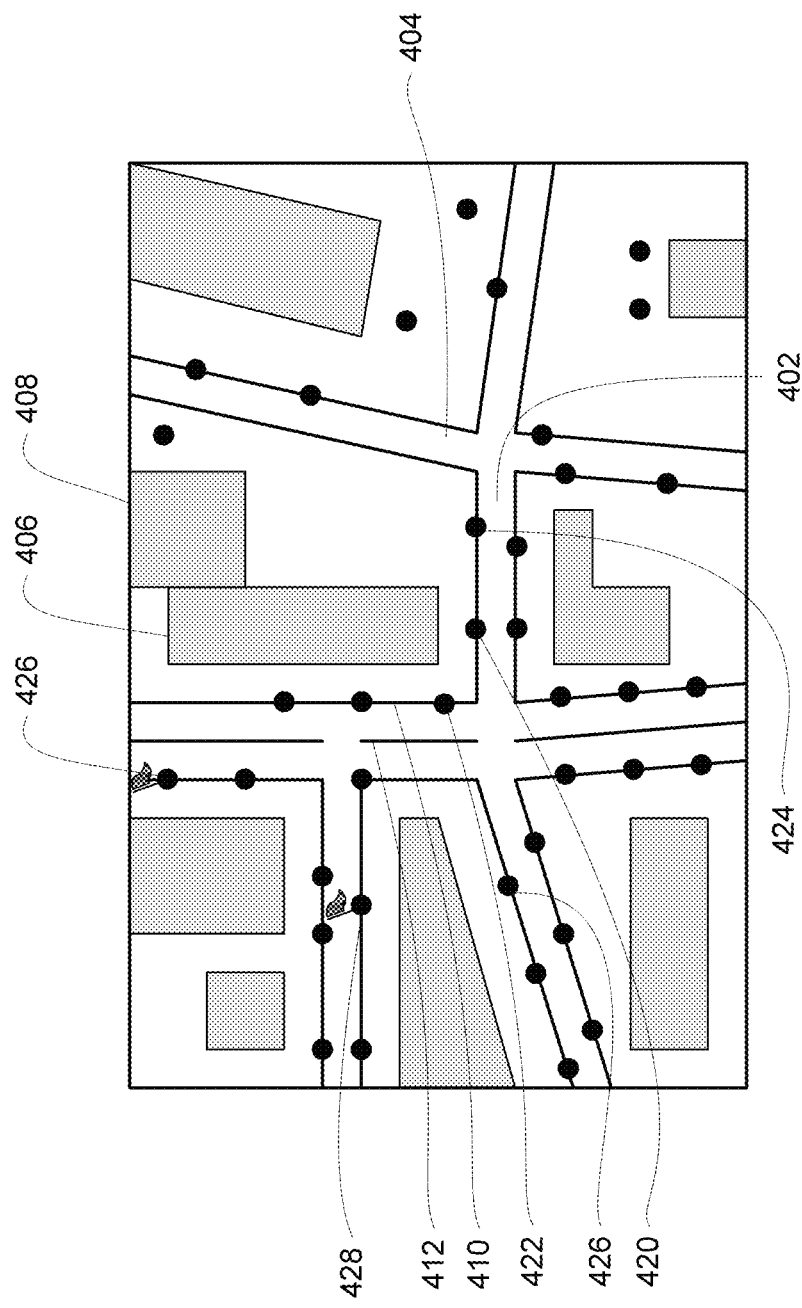
FIG. 4 is an example representation of map information in accordance with aspects of the disclosure.

The storage system 150 may also store detailed map information may include information about roads, crosswalks, buildings, elevations, fire hydrants, construction zones, real time traffic conditions, etc. from various sources such as governmental institutions, paid informational services, manually entered information, information gathered and provided in real time by autonomous vehicles, etc. FIG. 4 is an example of map information for a map 400. In this example, map information identifies roads 402, 404, buildings 406, 408, and lane lines 410, 412 (only a few of each of these features being numbered for simplicity).

The detailed map information may also include information identifying predetermined stopping locations where an autonomous vehicle can stop to pick up or drop off a passenger. For instance, map 500 includes predetermined stopping locations 420-424 (only a few of the predetermined stopping locations being numbered for simplicity). These predetermined stopping locations may include predetermined, reasonable locations where a vehicle could stop selected manually or through some analysis of the characteristics of each location. The predetermined stopping locations may also be limited to locations within a service area of the autonomous vehicle service. In at least some examples, the predetermined stopping locations may include one or more predesignated preferred stopping locations 426, 428 for the vehicles 101 or 101A which are flagged as being such for reasons related to ease of reaching, ability to stop for longer periods of time, likelihood of being available to stop, limited or no obstruction of other stopped or parked vehicles or the flow of traffic, within a certain distance, such as 50 meters or more or less, of a building or an entrance or exit of the building, etc.

The storage system 150 may also store a set of heuristics that may be used by the server computing device 110 to identify a recommended point. For instance, the heuristics may include a set of ranked requirements the highest of which may be served to the passenger as a potential location for pickup or drop off. For instance, in one example, for a location requested by a passenger ("passenger provided location"), the proposed ranking of heuristics may include:

- A favorite spot, chosen either explicitly by the user or implicitly based on the user's habits, location that may be included in the passenger's trip history for the service, if there is one nearby within x meters walking distance of the passenger provided location. As an example, x meters may be 100 meters or more or less.
- A recent location included in the passenger's trip history, if there is one nearby within x meters walking distance of the passenger provided location.
- A predesignated preferred stopping location (i.e. for the vehicle, not the passenger), if there is one nearby within x meters walking distance of the passenger provided location.
- A predetermined pickup location proximate to a known entrance to a building, if there is one nearby within y meters of an outline of a building of the map information, when the passenger provided location corresponds to a location within an outline of the building. As an example, y meters may be 50 meters or more or less.
- A closest predetermined stopping location to a street address corresponding to the passenger provided location when the passenger provided location is a GPS location of a client computing device associated with the passenger and the GPS location corresponds to a residential area identified in the map information.

A closest walkable predetermined stopping location to the passenger provided location.

Walkable distances may be determined by "straight line" distances between two points or may include a distance along a walkable route which may require one or more changes in direction between the two points. In this regard, walkable routes may be determined using the detailed map information or some other map for this purpose in order to route a passenger along a reasonable walking path. In some instances, walkable routes can be limited to routes that do not cross streets or only cross certain streets, such as those that are not too wide, historically not too busy, having crosswalks, etc.

In some examples, details about where a building's entrances and exits may not be included in the map information. However, this information may be inferred by identifying predetermined locations that are proximate to handicapped parking spots which are typically located as close as possible to building entrances. In that regard, whether there is a handicapped parking spot within y distance of the passenger provided location or within z distance, such as 20 meters or more or less, of a predetermined stopping location which is within y meters walking distance of the passenger provided location, may be additional heuristics which is ranked lower than a predetermined stopping location proximate to a known entrance to a building but higher than the otherwise closest walkable predetermined location. Alternatively, if the passenger provided location is a pickup location corresponding to the passenger's GPS location, this can be converted to an address. The address can be used to identify a building, which can then be used to identify nearby handicapped spots and infer the locations of entrances or exits.

As with memory 114, storage system 150 can be of any type of computerized storage capable of storing information accessible by the one or more server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to or incorporated into any of the computing devices 110, 120, 130, 140, 310 etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 122 and 132 may download the application via a link in an email, directly from a website, or an application store to client computing devices 120 and 130. For example, client computing device may transmit a request for the application over the network, for example, to one or more server computing devices 110, and in response, receive the application. The application may be installed locally at the client computing device.

The user may then use his or her client computing device to access the application and request a vehicle. As an example, a user such as user 132 may use client computing device 130 to send a request to one or more server computing devices 110 for a vehicle. As part of this, the user may identify a pickup location, a destination location, a pickup location and a drop off location. In this regard, the drop off location may be a physically different location from a destination location.

A user or passenger may specify a pick up and destination location in various ways. As an example, a pickup location can be defaulted to current location of the passenger's client computing device, but may also be a recent or saved location near the current location associated with the passenger's account. The passenger may enter an address or other location information, tap a location on a map or select a location from a list in order to identify a pickup and/or destination location. For instance, the client computing device 120 may send its current location, such as a GPS location, to the one or more server computing devices 110 via network 160. In response, the one or more server computing devices 110 may identify a relevant map area from the map information of storage system 150 and send this map to the client computing device 120 for display as shown in FIG. 5A.

In this example, marker 524 represents the estimated location of the client computing device 120 as displayed on map 528. A passenger uses his or her finger 522 to tap on a location of a map appearing on the display 124. Marker 526 of FIG. 5B represents the location of this tap. Alternatively, the passenger may select a location from a list in order to identify a pickup and/or destination location as shown in FIG. 5C. In this example, the passenger may be selected from saved locations via tab 530, recent locations via tab 540, or enter a new location via the search tab 550. The saved and recent locations may be stored by the application locally at the client computing device 120 or may be requested from the one or more server computing devices 110. In this regard, the one or more server computing devices 110 may retrieve the information from the passenger's account information at the storage system 150 and provide it to the client computing device 120. The selected pickup or drop off location (corresponding to the current location of the client computing device or another location specified by the passenger), may then be provided to the one or more server computing devices 110 by the application of the client computing device 120 via network 160.

Once the one or more server computing devices 110 have received the selected location, the one or more server computing devices 110 may provide a suggestion or recommended pickup or drop off point. In order to do so, the one or more server computing devices may access the map information and the set of heuristics of storage system 150 to identify a recommended point. In other words, give the selected pickup and/or destination location, the one or more server computing devices may identify a predetermined stopping location using the heuristics.

In the example heuristics provided above, if there is a Favorite spot saved in this particular passenger's account that is within 100 meters of the selected location, the one or more server computing devices may identify this Favorite spot as the recommended point. If not, the one or more server computing devices may determine whether there is a recent pick up or drop off location in the passenger's trip history that is within 100 meters of the selected location. If so, the one or more server computing devices may identify this recent location as the recommended point. If not, the one or more server computing devices may determine whether there is a preferred pullover spot within 100 meters of the selected location. If so, the one or more server computing devices may identify this preferred pullover location as the recommended point. If not, the one or more server computing devices may determine whether there is a predetermined stopping location within 50 meters of a known entrance to a building. If so, the one or more server computing devices may identify the predetermined stopping location within 50 meters of the known entrance as the recommended point. If not, as a default, the one or more server computing devices may identify a closest walkable predetermined stopping location to the requested location as discussed above.

The one or more server computing devices may then provide a notification to the client computing device including a recommended point identified using the heuristics as discussed above. A recommended point, shown as marker 602 in FIG. 6, may be sent with a map of the area (or displayed on a previously provided map) around the point such that the recommended point is presented on the map on a display of the passenger's client computing device 120. In this example, the recommended point corresponds to predetermined pickup location 424 of map 400 of FIG. 4. If the recommended point is a pickup location as in the example of FIG. 6, the map 528 may also include the marker 524 identifying a current location of the passenger's client computing device to give context to the passenger of the relative positions of the recommended point and the passenger's current location (presuming it corresponds to that of his or her client computing device 120).

When generating the map for display, the zoom level of the map may be chosen so that the recommended point is clearly visible in relation to the initially requested pick up or drop off location. In some instances, the passenger may be selecting a location using the map as discussed above. When this occurs, once the user initially places a marker or identifies a location to denote a selected pickup or drop off location, the zoom level of the map may be adjusted in order to display both the requested location and the recommended point or recommended points. This may include zooming in to show a reasonable level of detail around the requested location and the recommended point, or zooming out if the map is zoomed in too much and the recommended point would otherwise have been off screen. Alternatively, the map could be automatically zooming out further to display multiple options, but there is a tradeoff between showing a wide area and enough detail or context with respect to the recommended point such that the passenger is able to be reasonably apprised of the details of the area. If the map is zoomed such that the passenger is able to view both the requested location and the recommended point, the zoom level of the map need not be adjusted. In all such cases, the optimal location of the recommended point is away from the edges of the screen or towards the center of the display.

In addition to providing the notification, the one or more server computing devices 110 may also send information identifying all predetermined stopping locations within a predetermined radial distance or a radius of a predetermined distance n, such as 300 meters or more or less, to the client computing device 120. As an example, this radius may be measured from the location of the client computing device (e.g. marker 524), the recommended point (e.g. marker 602), or both. If both, the server computing devices 110 may send all of the predetermined stopping locations within each of the circles.

By sending these additional predetermined stopping locations, if the passenger chooses to move a marker corresponding to the recommended point relative to the map, such as moving the marker by panning on the map, the client computing device may surface all or some of these identified predetermined pickup locations. For instance, turning to FIG. 6, the passenger is using his or her finger 522 to pan on the map 528. This allows the passenger to see all nearby predetermined stopping identified from the map 400, including, for example, predetermined stopping locations 702-706 (only a few being numbered for simplicity), and compare the usefulness, ease of accessibility, and placement of those locations to that of the current location of the client computing device or marker 524. In order to do so smoothly, each time the user pans, the client computing device may request additional predetermined pickup locations using the predetermined distance n relative to the current location of the marker (as moved by the passenger's finger 522).

Each time the passenger stops the panning, the passenger may be considered to have "dropped" a new marker at the center of the map ash shown in FIG. 8. In this way, the predetermined stopping location closest to the marker may be selected as the pickup or drop off location for a trip. In FIG. 8, the closest predetermined stopping location corresponds to stopping location 420 of FIG. 4. At the same time, the client computing device 120 may request a walkable path from the one or more server computing devices which may provide the walkable path. In this regard, a walkable path 902 may be between the client computing device's current location (e.g. marker 524) and the selected pickup location (e.g. marker 802) as shown in FIG. 9 or the selected drop off location and the destination depending on the situation. Alternatively, the walkable path may be determined locally at the client computing device 120 using the map information provided by the one or more server computing devices. The walkable path may be drawn between the new location of the marker and the location marker.

In addition as noted above, while the passenger is selecting a drop off location and/or once the vehicle has reached the drop off location, the display may include a walkable path between the recommended point and the location marker again to give the user context. This walkable path may be generated by the one or more server computing devices using the map information. For ease of understanding, the walkable path may be displayed as a series of "dots" or other markers between the drop off location and the destination as shown in FIG. 9. The series of dots may be displayed at once or in an animation (as if the dots were appearing to lead the passenger towards the destination). To avoid clutter on the display, the walkable dots may be displayed as the same size, relative distance between one another (with respect to the display, not the features in the map), and at the same speed no matter what the zoom level. If selecting the drop off location, the passenger may then select the recommended point as a pickup or destination location and initiate (or continue as the case may be) a trip. If the location is a pickup location, the server may then dispatch a vehicle to the selected location to pick up the passenger for a trip.

In addition, specific areas of the destination, if known, may be highlighted. For instance, the passenger may "reroute" the walkable path between the drop off location different entrances of a building with multiple entrances such as a mall or museum. This may allow the passenger greater context about different drop off locations when selecting a destination and provide walkable directions that are actually helpful to the passenger once the vehicle reaches the drop off location.

In addition to displaying nearby predetermined stopping locations when panning the map, the client computing device may also highlight or display markers for any "favorite" spots for this passenger. In this regard, whenever the passenger has stopped panning, any nearby favorite spots may be identified with additional markers. For example, as shown in FIG. 10, predetermined stopping location 426 is depicted with a marker 1002 to indicate to the passenger that this predetermined stopping location corresponds to a favorite. These favorite spots may correspond to locations that were previously saved by the passenger in his or her account and may be used to determine how to initially center the map.

For instance if a passenger saves a marker for a favorite at his or her office building, with the name "WORK" and later opened the application while the passenger's client computing device was proximate to (i.e. within 50 meters or more or less) of that marker, the application may display "WORK" in the location box at the top of the application and center the map around that favorite (here marker 1102) instead of centering the map on whatever location to which the current location of the passenger's client computing device 120 would have reverse geocoded (e.g. marker 524) as shown in FIG. 11. In this example, a walkable path is also displayed between the location of the client computing device and the favorite. In addition, the favorite spot may be used when identifying possible pickup locations using the heuristics discussed above. This may provide a more stable experience for the passenger over the course of several trips because the available pickup locations are probably similar to what was available to the passenger at the time the favorite spot was saved by the passenger.

In addition, when selecting pickup and drop off locations, the one or more server computing devices may use how that input location was specified by the passenger as an indication for adjusting the rankings of the heuristics. In other words, the one or more server computing devices may consider whether the map was positioned explicitly by a human (such as panning the map to a specific point or tapping a GPS button which centers the map on the location, e.g. GPS location, of the client computing device) or the position was determined by some other interaction (such as tapping a GPS button which centers the map on the location, e.g. GPS location, of the client computing device, tapping a search result, building with several businesses or entrances, a large area such as a public park, etc.). In the former case, the one or more server computing devices may put more emphasis on the exact location the passenger has positioned the map and focus on finding the closest predetermined pickup location. In other words, when the passenger is panning around on the map, he or she may see all of the predetermined stopping locations so the passenger is basically moving the map to highlight the reachable area which he or she prefers. Similarly, if the passenger uses the location button, this may automatically set the pickup location to the client computing device's GPS location.

In the latter case, the passenger may be providing a location with a somewhat "lower resolution" or rather, the identification of the location is less clear and precise. the one or more server computing devices to figure out which of the surrounding predetermined stopping locations to propose to the passenger for pickup or drop off. In the cases where the search result maps to a popular, perhaps large, location the one or more server computing devices may suggest areas near known entrances (i.e. increasing the ranking of this heuristic). As another example, if a passenger were to use his or her client computing device to tap on a business on a map, it is more likely that the passenger would want to go to that business. In such an example, the one or more server computing devices may weigh entrance oriented suggestions more highly (i.e. increase the ranking of the heuristic related to a predetermined pickup location proximate to a known entrance to a building). Alternatively, if the passenger was panning on the map manually and stopped with the building at the center, the one or more server computing devices may not need to adjust the rankings of any of the heuristics but may provide suggestions according to the ranking as discussed above.

In some instances, more than one recommended point may be identified using the heuristics. This may be most likely when using the closest walkable predetermined stopping location. In such cases, the multiple recommended points may be displayed simultaneously with alternative walkable paths. The passenger may then be required to select one of the recommended points or may simply use the panning option to surface other locations as discussed above.

In some instances, the passenger may even adjust a pickup or drop off location in real time. For example, if the passenger is already waiting for his or her vehicle to arrive, the passenger may be able to identify the best available location for the vehicle to stop simply by observing his or her environment and using his or her client computing device to communicate this to the vehicle's computing devices. Again, by allowing the passenger to pan the map as discussed above, he or she can indicate locations corresponding to the best location as the passenger sees it in the real world in real time and communicate that information to the vehicle's computing devices quickly and easily. The map may at the same time provide some visual guidance to the passenger as to the general area the vehicle's computer devices will consider for stopping the vehicle before the user releases the map (i.e. ends the panning) by highlighting in some fashion the closest predetermined stopping locations.

Once the user has selected one or more of a pickup and/or destination locations, the client computing device 120 may send the location or locations to one or more server computing devices of the centralized dispatching system. In response, the server computing devices 110 may select a vehicle 101 or 101A, for instance based on availability and proximity to the passenger. The server computing device may then dispatch the selected vehicle to pick up to the user by providing the vehicle 101 or 101A with the pickup, drop off, and/or destination locations specified by the user.

The information displayed at the passenger's client computing device by the application may change depending on the stage of the trip. As an example, when the passenger is waiting for a vehicle, the application on the passenger's client computing device may display a marker for the passenger's current location (really, that of the passenger's client computing device), a marker for the pickup location, and a marker for the vehicle's current location. Once the passenger enters the vehicle, the display may zoom out of the map in order to show a marker for the current location of the vehicle and a marker for the drop off location. In addition, as the drop off location may be slightly different from the actual destination (i.e. a parking lot versus a building), the destination may also be marked or highlighted as well. After the vehicle has stopped at the drop off location, the display may include a marker for the drop off location as well as a marker for the destination location. In some instances, a walking path between the drop off location and the destination may also be displayed. For all of these examples, the display may pan and zoom on the map to appropriately fit the markers as discussed above.

Figure 12:
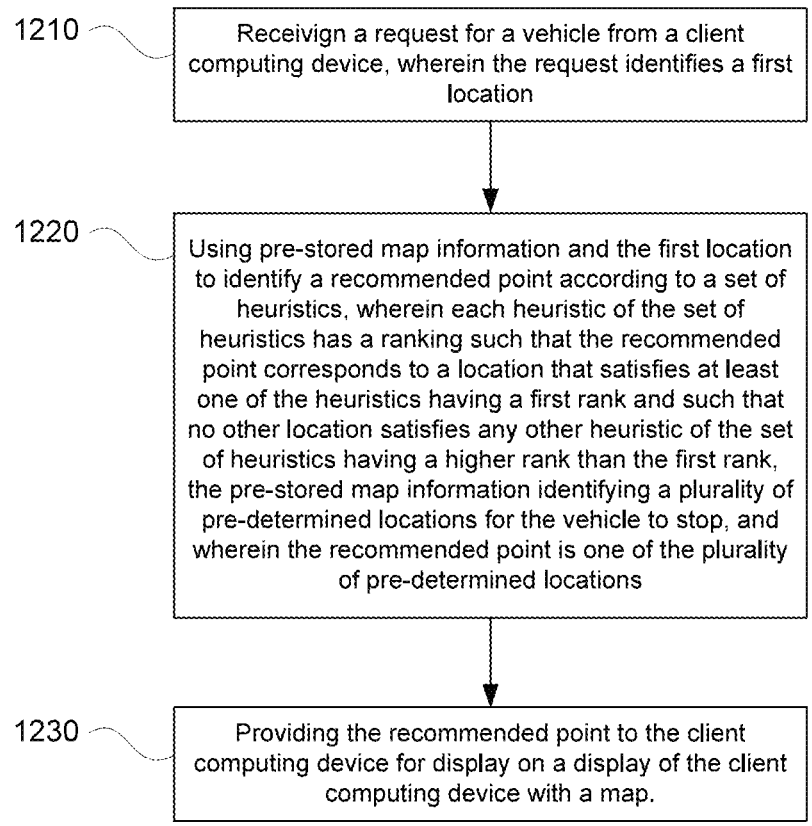
FIG. 12 is an example flow diagram in accordance with aspects of the disclosure.

FIG. 12 is an example flow diagram 1200 in accordance with some of the aspects described above that may be performed by one or more computing devices such as the one or more server computing devices 110. At block 1210, a request for a vehicle is received from a client computing device, wherein the request identifies a first location. This first location may be a pickup location or a destination location for a passenger. Pre-stored map information and the first location are used to identify a recommended point according to a set of heuristics at block 1220. Each heuristic of the set of heuristics has a ranking such that the recommended point corresponds to a location that satisfies at least one of the heuristics having a first rank and such that no other location satisfies any other heuristic of the set of heuristics having a higher rank than the first rank. The pre-stored map information identifying a plurality of pre-determined locations for the vehicle to stop, and the recommended point is one of the plurality of pre-determined locations. The recommended point is provided to the client computing device for display on a display of the client computing device with a map at block 1230. FIG. 12 is an example flow diagram 1200 in accordance with some of the aspects described above that may be performed by one or more computing devices such as the one or more server computing devices 110. At block 1210, a request for a vehicle is received from a client computing device, wherein the request identifies a first location. This first location may be a pickup location or a destination location for a passenger. Pre-stored map information and the first location are used to identify a recommended point according to a set of heuristics at block 1220. Each heuristic of the set of heuristics has a ranking such that the recommended point corresponds to a location that satisfies at least one of the heuristics having a first rank and such that no other location satisfies any other heuristic of the set of heuristics having a higher rank than the first rank. The pre-stored map information identifying a plurality of pre-determined locations for the vehicle to stop, and the recommended point is one of the plurality of pre-determined locations. The recommended point is provided to the client computing device for display on a display of the client computing device with a map at block 1230.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
receiving, by one or more processors, a request for a vehicle from a client computing device associated with a passenger, wherein the request identifies a first location;
upon receiving the request, accessing, by the one or more processors, pre-stored map information including a plurality of locations each flagged as being a preferred location;
identifying, by the one or more processors, a recommended location for the vehicle to stop based on the flagged locations and a plurality of heuristics, wherein the recommended location satisfies at least one of the plurality of heuristics; and
providing, by the one or more processors, the recommended location to the client computing device for display with a map on a display of the client computing device, wherein the recommended location is provided as a suggested alternative to the first location.

2. The method of claim 1, wherein one of the flagged locations is a location that is easy for the vehicle to reach.

3. The method of claim 1, wherein one of the flagged locations is a location that allows the vehicle to stop for a long period of time.

4. The method of claim 1, wherein one of the flagged locations is a location that is not obstructed.

5. The method of claim 1, wherein one of the flagged locations is a location that is proximate to a building or an entrance or exit of the building.

6. The method of claim 1, wherein the plurality of heuristics include a set of ranked heuristics.

7. The method of claim 6, wherein the ranked heuristics include a favorite spot that is chosen based on habits of the passenger.

8. The method of claim 6, wherein the ranked heuristics include a location that is included in a trip history of the passenger.

9. The method of claim 6, wherein the ranked heuristics include a predesignated preferred stopping location for the vehicle.

10. The method of claim 6, wherein the ranked heuristics include a predetermined pickup location proximate to a known entrance to a building.

11. The method of claim 6, wherein the ranked heuristics include a closest predetermined stopping location to a street address corresponding to a passenger-provided location when the passenger-provided location is a GPS location of the client computing device.

12. The method of claim 6, wherein the ranked heuristics include a walkable predetermined stopping location predetermined stopping closest to the passenger.

13. A system comprising:
one or more processors configured to:
receive a request for a vehicle from a client computing device associated with a passenger, wherein the request identifies a first location;
upon receiving the request, access pre-stored map information including a plurality of locations proximate to the first location each flagged as being a preferred location;
identify a recommended location for the vehicle to stop based on the flagged locations and a plurality of heuristics, wherein the recommended location satisfies at least one of the plurality of heuristics; and provide the recommended location to the client computing device for display with a map on a display of the client computing device, wherein the recommended location is provided as a suggested alternative to the first location.

14. The system of claim 13, wherein one of the flagged locations is a location that is easy for the vehicle to reach.

15. The system of claim 13, wherein one of the flagged locations is a location that allows the vehicle to stop for a long period of time.

16. The system of claim 13, wherein one of the flagged locations is a location that is not obstructed.

17. The system of claim 13, wherein one of the flagged locations is a location that is proximate to a building or an entrance or exit of the building.

18. The system of claim 13, wherein the plurality of heuristics include a set of ranked heuristics.

19. The system of claim 18, wherein the ranked heuristics include a favorite spot that is chosen based on habits of the passenger.

20. The system of claim 19, wherein the ranked heuristics include a location that is included in a trip history of the passenger.

21. The system of claim 19, wherein the ranked heuristics include a predesignated preferred stopping location for the vehicle.

22. The system of claim 19, wherein the ranked heuristics include a predetermined pickup location proximate to a known entrance to a building.

23. The system of claim 19, wherein the ranked heuristics include a closest predetermined stopping location to a street address corresponding to a passenger-provided location when the passenger-provided location is a GPS location of the client computing device.

24. The system of claim 19, wherein the ranked heuristics include a walkable predetermined stopping location predetermined stopping closest to the passenger.

* * * * *